(12) United States Patent
Moravick et al.

(10) Patent No.: US 11,485,248 B2
(45) Date of Patent: Nov. 1, 2022

(54) VEHICLE SIDE ELECTRONICS TO PROVIDE COMMUNICATION AND CONTROL OVER A WIRED CHARGE CONNECTOR INCLUDING PROVISIONS FOR VEHICLE BATTERY HEATING CONTROL

(71) Applicant: Swiftmile, Inc., Mountain View, CA (US)

(72) Inventors: Keith Edward Moravick, Mountain View, CA (US); George Pontis, Vancouver, WA (US)

(73) Assignee: Swiftmile, Inc., Mountain View, CA (US)

( * ) Notice: Subject to any disclaimer, the term of this patent is extended or adjusted under 35 U.S.C. 154(b) by 0 days.

(21) Appl. No.: 17/063,257

(22) Filed: Oct. 5, 2020

(65) Prior Publication Data

US 2022/0105826 A1  Apr. 7, 2022

(51) Int. Cl.
*B60L 53/66* (2019.01)
*H04B 3/54* (2006.01)
*B60L 58/27* (2019.01)
*B60L 53/18* (2019.01)
*B60R 16/023* (2006.01)
*B60L 53/65* (2019.01)

(52) U.S. Cl.
CPC ............... *B60L 53/66* (2019.02); *B60L 53/18* (2019.02); *B60L 53/65* (2019.02); *B60L 58/27* (2019.02); *B60R 16/0231* (2013.01); *H04B 3/54* (2013.01); *B60L 2200/12* (2013.01); *B60L 2200/24* (2013.01); *B60L 2240/545* (2013.01)

(58) Field of Classification Search
CPC ...... B60L 53/66; B60L 53/65; B60L 2200/24; B60L 2200/12; B60L 58/24; B60L 2240/545; H04B 3/54
See application file for complete search history.

(56) References Cited

U.S. PATENT DOCUMENTS

| 2008/0312782 A1* | 12/2008 | Berdichevsky ......... B60L 58/13 701/22 |
| 2011/0106329 A1* | 5/2011 | Donnelly ................ B60L 53/64 700/291 |
| 2014/0021913 A1* | 1/2014 | Martin .................... B60L 53/66 320/109 |

(Continued)

FOREIGN PATENT DOCUMENTS

EP  2913259 A1 * 9/2015 .............. B62M 6/90

*Primary Examiner* — David V Henze-Gongola
(74) *Attorney, Agent, or Firm* — Keith Kline; The Kline Law Firm (57) ABSTRACT

A system for providing communication and control for a Light Electric Vehicle (LEV) over a power line is provided. The system includes a microprocessor, an interface, a heater controller, a data coupler, and an external connector interface. The interface is configured to communicate with a control system of the LEV. The heater controller is configured to control a battery heater of the LEV. The data coupler is configured to couple a data communication channel onto the power line. The external connector interface is configured to exchange vehicle data with a charging structure associated with the LEV via the data communication channel over the power line when the LEV is plugged into the charging structure.

17 Claims, 6 Drawing Sheets

(56) References Cited

U.S. PATENT DOCUMENTS

| | | | | |
|---|---|---|---|---|
| 2015/0239405 A1* | 8/2015 | Kaihara | ............... | B60L 53/14 |
| | | | | 219/202 |
| 2018/0229608 A1* | 8/2018 | Kuramoto | ............... | B60L 58/15 |
| 2019/0300102 A1* | 10/2019 | Ishikawa | ............... | B62M 6/45 |

* cited by examiner

VEHICLE SIDE ELECTRONICS TO PROVIDE COMMUNICATION AND CONTROL OVER A WIRED CHARGE CONNECTOR INCLUDING PROVISIONS FOR VEHICLE BATTERY HEATING CONTROL

TECHNICAL FIELD

The present invention relates generally to light electric vehicles or battery electric vehicles (herein either or both may be referred to as LEVs) and charging structures for the LEVs and, more particularly, to providing communication and control for LEVs over a wired charge connector.

BACKGROUND

Currently, there are no adequate solutions for direct data exchange between charging infrastructure and LEVs such as electric scooters or electric bicycles. Such data exchanges at the charger level would be very useful for charging and other purposes. For example, at a low temperature, lithium ion batteries used by electrical vehicles are charged differently than at higher temperatures. Additionally, there are various other limitations on the use of lithium ion batteries depending on the temperature. For example, the batteries can discharge over a wide temperature range but can only be charged over a much smaller temperature range. There is currently no way for the charging infrastructure to obtain the temperature and other parameters of the battery from an LEV if the LEV is not integrated into a charging infrastructure at the factory level. Knowing temperature parameters of the battery would allow activating a battery heater on the LEV based on information provided from the LEV safely without causing any issues to the LEV or charging infrastructure.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one approach of the present disclosure, a system for providing communication and control for an LEV over a power line is provided. The system includes a microprocessor, an interface, for example, a Controller Area Network (CAN) or other interface, a heater controller, a data coupler, and an external connector interface. The interface is configured to communicate with a control system of the LEV. The heater controller is configured to control a battery heater of the LEV. The data coupler is configured to couple a data communication channel onto the power line. The external connector interface is configured to exchange vehicle data with a charging structure associated with the LEV via the data communication channel over the power line when the LEV is plugged into the charging structure.

According to another approach of the present disclosure, a method for providing communication and control for an LEV over a power line is provided. The method can commence with establishing, via a communication interface, a communication channel with a control system of the LEV. The method can then collect vehicle data using the communication channel. The method further includes establishing a connection with a charging structure. The method continues with coupling a data communication channel by a data coupler onto the power line for transmission of the vehicle data to the charging structure. The method also includes utilizing an external connector interface to exchange the vehicle data with the charging structure via the data communication channel over the power line when the LEV is plugged into the charging structure.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

The features of the invention are set forth with particularity in the appended claims. A better understanding of the features and advantages of the present invention will be obtained by reference to the following detailed description that sets forth illustrative embodiments, in which the principles of the invention are utilized, and which the accompanying drawings illustrate.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure provides systems and methods for communication and control for an LEV over a power line. The disclosed technology allows for direct data communications between LEVs and corresponding charging infrastructure over a charging power line. The direct communications can include two-way communications or one way communications. The communication can be strictly from the LEV to the charging infrastructure. The disclosed systems are non-invasive to the systems of LEVs and do not require tapping into the resources onboard of the LEVs. The system of the present disclosure resides on the LEV and can be idle until the LEV is plugged into the charging infrastructure. The system does not require to be powered by the LEV. When the LEV is plugged into the charging infrastructure, either via a charge adapter or over a cable connection, the system receives power and is able to deliver information concerning the LEV to the charging infrastructure. For example, the information can include an identifier (ID) of the LEV. Any information received from the LEV can be associated with the LEV based on the ID. For example, the associated information can include a state of the battery of the LEV, such as a temperature of the battery. As mentioned above, the temperature of the battery can affect charging capabilities and charging procedures and protocols. At low temperature, a lithium ion battery needs to be charged differently than at higher temperatures. Based on the provided information, a heater can be activated to bring the battery up to an appropriate temperature for charging. The system can activate the battery heaters of the LEV and other vehicle functionalities without using the power of the LEV.

The information can be exchanged using a charge interface over a wired connection, such as a 2-wire connection, that is used to deliver power to the LEV. The charging structure can include charge electronics and a vehicle interface board. The vehicle interface board can include a microprocessor or a microcontroller. The vehicle interface board can be integrated into a LEV. The communications between the system and charging infrastructure are carried out at the charger level. The charger can be connected to the system of the present disclosure via a CAN bus. The disclosed technology allows the system to be integrated into an LEV that has not been specifically designed to exchange data with the charging infrastructure.

The system can be implemented as an aftermarket, a third-party retrofit interface kit that connects to an LEV. Alternatively, the system can be designed to be integrated at the factory level. The system can attach to and communicate with vehicle electronics over a standard CAN bus. The communicated information can include requirements, capacity, and current charge state of the battery. The LEV information can be collected upon the initial connection, periodically, or upon request. For example, the information broadcast by the LEV over an interface, such as a Controller Area Network (CAN) interface (also known as a CAN bus), can be collected. Once the LEV is plugged into the charging structure, the information can be communicated to the charging structure, which can, in turn, communicate the information to a backend system via a network. With bidirectional communications, logs can be downloaded from the LEV. If the power structure loses its connectivity with the backend system, it can potentially allow reading the logs made on the LEV side. Turning a battery heater on may be a two-way process that includes reading temperature and turning on/off the battery heater.

Because there are many different battery standards, it is important for the power structure to have vehicle battery information in order to safely connect to the LEV and charge the vehicle battery properly without causing any issues to the LEV or charging infrastructure. The system provides a universal solution to this problem. A data coupler can be used to superimpose the communication signal over the power line. There can be different types of data couplers and several methods that can be used to superimpose the data signal on the power signal. For example, the power delivered by the charging structure can be DC power such that the ground voltage is around zero and the high voltage is around 42 volts. As the vehicle battery discharges, the voltage of the vehicle battery drops. The data communication channel can be coupled onto the power line by small voltage modulation on top of the standard voltage provided to the LEV. The signal can be coupled and decoupled by the system and charging structure on both the transmitting and on receiving ends and, thus, transmitted over the power line.

The system provides sustainability, safety, the economic equality of the business and cost savings. The sustainability in the ecosystem is achieved by providing an infrastructure of charging stations to support all types of LEVs. The safety is provided due to the information exchange such that it is known that the LEV is safely charged under the conditions. The cost savings can be achieved because, among other reasons, there is no need to have an operation crew to pick up LEVs and to bring them home to charge.

LEVs may not have external charge connectors. For example, the LEVs designed for swappable batteries do not have charge connectors and, therefore, the batteries are not charged in the LEV, but replaced with charged batteries. The system described in the present disclosure can be used with LEVs that do not have an existing wired charge connector. A vehicle interface board of the system may allow adding a wired charge connector to the LEV. Therefore, one of advantages and benefits of using the system of the present disclosure is that if an LEV does not have a charge connector, connecting the vehicle interface board of the system to the LEV provides the LEV with a charge connector.

Figure 1:
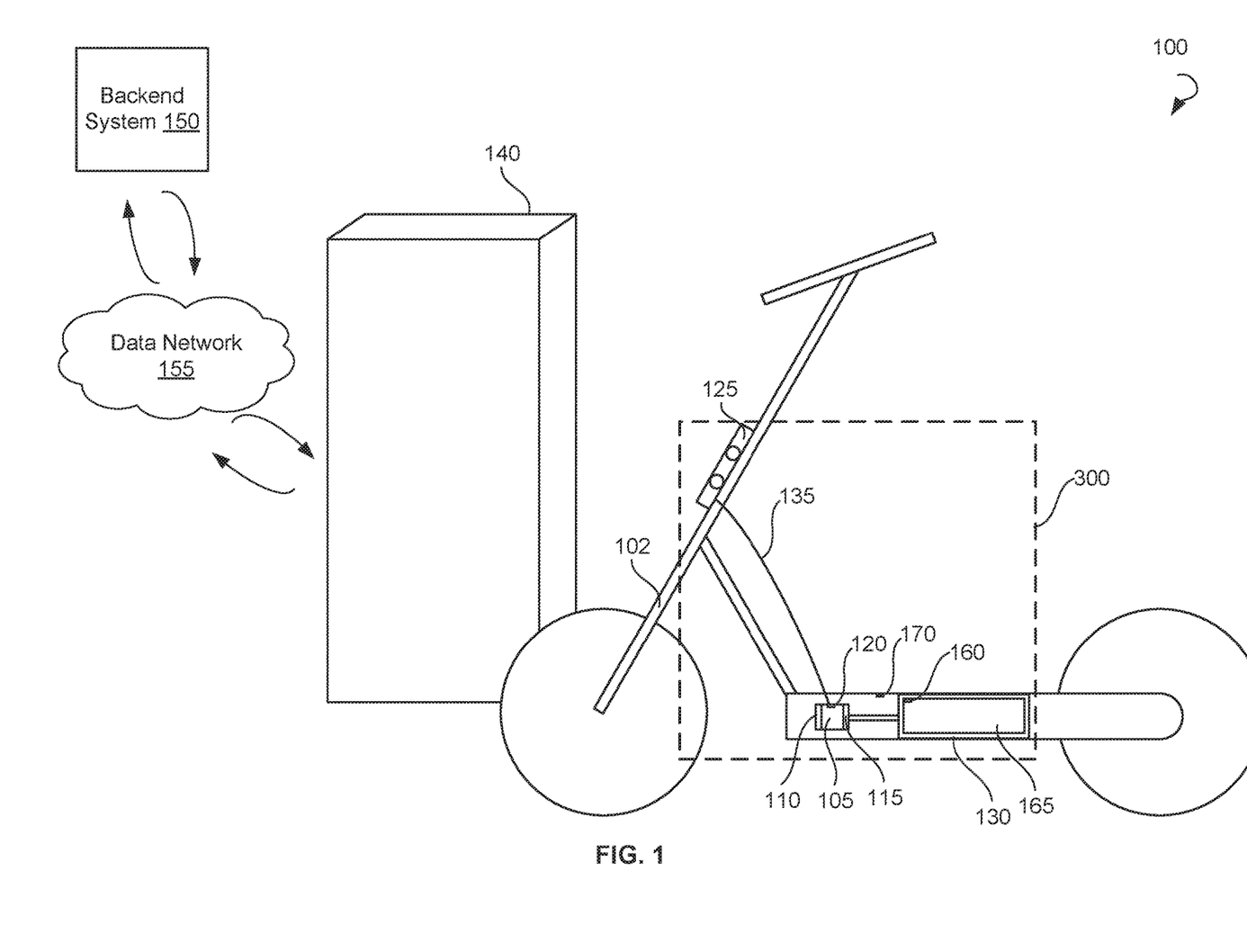
FIG. 1 is a schematic diagram illustrating a system for providing communication and control for a Light Electric Vehicle (LEV) over a power line, according to an example embodiment.

Referring now to the drawings, FIG. 1 is a schematic diagram showing an environment 100 in which a system 300 for providing communication and control for an LEV 102 over a power line can be provided, according to an example embodiment. The system 300 can include a microprocessor 105, a CAN interface 110, a heater controller 115, a data coupler 120, and an external connector interface 125. The CAN interface 110 can be configured to communicate with a control system of the LEV 102. The heater controller 115 may be configured to control a battery heater 130 of the LEV 102.

The LEV 102 may include a battery 165 and may be charged using a charging structure 140 (also referred herein to as a charging infrastructure or a charging station). All batteries have battery-specific temperature limitations. For example, the lithium ion batteries can discharge over a wide temperature range but can be charged over a much smaller temperature range. The LEV with the lithium ion batteries can be used at low temperatures, e.g., below freezing temperatures, but the lithium ion batteries cannot be recharged at those low temperatures. For example, the lithium ion batteries can be used at up to 120 degrees Fahrenheit, but the lithium ion batteries cannot be charged at the temperatures over 104 degrees.

By using the heater controller 115, the temperature range of charging the battery 165 can be extended to lower temperatures. The power can be directed from the charging structure 140 directly to a battery heater 130 of the LEV 102 until an indication that the battery 165 itself is at an appropriate temperature to start charging is received from the LEV 102. This feedback loop from the LEV 102 can be implemented in multiple ways. For example, when the charging structure 140 has access to a CAN bus associated with the CAN interface 110, the charging structure 140 can receive reports showing the temperature of the battery 165.

In another example embodiment, the system 300 may include a temperature sensor 160, such as, for example, a thermistor sensor, an integrated circuit, or a platinum resistance temperature detector, which may be configured to measure temperature of the battery 165. The temperature sensor 160 may provide reports to the charging structure 140. The temperature sensor 160 can be connected to the microprocessor 105. In some example embodiments, the temperature sensor can be configured to receive the temperature of the battery of the LEV from a control system of the LEV.

An appropriate action can be performed based on the temperature. Specifically, when the temperature of the battery 165 is below a threshold temperature, the heater controller 115 may cause the battery heater 130 to activate. A calculation or a lookup table can be used to determine what external temperature (the temperature provided by the battery heater 130) needs to be achieved in order to have the required internal temperature (temperature of the battery 165).

The data coupler 120 may be configured to couple a data communication channel onto the power line 135. The external connector interface 125 may be configured to exchange vehicle data with the charging structure 140 via the data communication channel over the power line 135 when the LEV 102 is plugged into the charging structure 140. In an example embodiment, the power line may include a 2-wire. The vehicle data may include, for example, an ID of the LEV 102. The ID of the LEV 102 may include data associated with a registration number of the LEV 102, an LEV operator that performs maintenance of the LEV 102, and any other identification information. Information associated with the equipment of the LEV 102 can be determined based on the ID.

The ID of the LEV 102 can be received from a static ID device 170 installed on the LEV 102. Any vehicle data (e.g., a state of the battery 165 of the LEV 102, temperature of the battery 165) received from the LEV 102 can be associated with the LEV 102 based on the ID. The static ID device 170 can have the ID of the LEV 102 encoded into the static ID device 170. In an example embodiment, the static ID device 170 does not require any power of the LEV 102 or any power at all. For example, the static ID device 170 may be pinned to the LEV 102 and the ID of the LEV 102 can be read from the static ID device 170 when the LEV 102 is connected to the charging structure 140. The external connector interface 125 can be configured to identify the LEV 102 using the static ID device 170.

In a further example embodiment, the ID can be part of the microprocessor 105. The ID can be communicated over the power line similarly to how the vehicle data is communicated. In some embodiment, the LEV 102 may have an ID device, such as a radio-frequency identification (RFID) chip installed on the LEV 102 that may broadcast the ID of the LEV 102. The system 300 may include a reader, such as an RFID reader, configured to read IDs from ID devices, such as RFID chips.

The external connector interface 125 may be further configured to establish a communication via the charging structure 140 using a handshaking technique. The handshaking technique may include identifying the LEV 102 using the static ID device 170 installed on the LEV 102. In an example embodiment, the static ID device 170 may be pinned to the external connector interface 125.

In some embodiments, a communication can be initiated using a handshaking technique, according to which, the LEV 102 connects to the charging structure 140 and the ID of the LEV 102 is read from the static ID device 170 by the charging structure 140 and validated with a database. A one-way communication can occur when the LEV is plugged into the charging structure and the vehicle interface board periodically sends identification data, temperature measurements, and other types of vehicle data the vehicle interface board collects from the LEV. Another approach includes sending queries and receiving responses. For example, the vehicle interface board can initiate communications with the charging structure by announcing its presence, and requesting an acknowledgement of being connected. Thereafter, a higher level host system (e.g., the backend system) can ask for vehicle data, such as temperature of the battery, and can issue commands to turn the battery heater on, turn the battery heater off, and so on. In some embodiments, the communication is established as a one-way communication while in other embodiments, the communication includes a two-way/bidirectional communication.

In some embodiments, the handshaking technique includes a handshake where the charging structure 140 sends a piece of information to the microprocessor 105 of the LEV 102, and the microprocessor 105 responds back to the charging structure 140, and then charging structure 140 sends a confirmation. Upon completion of the handshaking procedure, other information can be collected by the charging structure 140 from the LEV 102 via a data stream. The LEV 102 may send the vehicle data continuously to the charging structure 140. During the handshaking procedure, the charging structure 140 can establish the required form of communications, such as bi-directional or unidirectional communications.

In an example embodiment, the battery 165 can be configured to consume a very high charging current such that the battery 165 can be charged fast. Thus, if the LEV 102 capable of consuming a high current connects to the charging structure 140, the information exchanged between the charging structure 140 and the LEV 102 may include a notification sent by the LEV 102 indicating that the battery 165 can consume high charging current. Additionally, the information sent between the charging structure 140 and the LEV 102 can include limits for the charging rate of the LEV 102, the voltage of the battery 165 (e.g., a 48 volt battery or a 36 volt battery), and so forth.

The charging structure 140 can be configured to transfer the vehicle data to a backend system 150 associated with the charging structure 140 via a data network 155. In an example embodiment, the vehicle data can be sent to the backend system 150 using a cellular protocol. The vehicle data can include one or more of the following: charge information, battery requirements, a battery state, pre-use settings, an ID of the LEV, a state of the battery, temperature of the batteries, vehicle circulation, infrastructure utilization, and so forth.

In some example embodiments, the vehicle data collected by the charging structure 140 may include the usage of the LEVs 102, i.e. the utilization of the infrastructure of charging structures and by the LEVs with the system 300 installed. Based on the usage, frequency of use of the LEVs can be determined. The information related to the frequency of use of the LEVs may be used for marketing purposes in order to spread the usage of the system 300 in cities and ecosystems, obtain permit for the LEVs from municipalities and other stakeholders to operate, as well as to collect and provide vehicle usage and parking information, and so forth.

Figure 2:
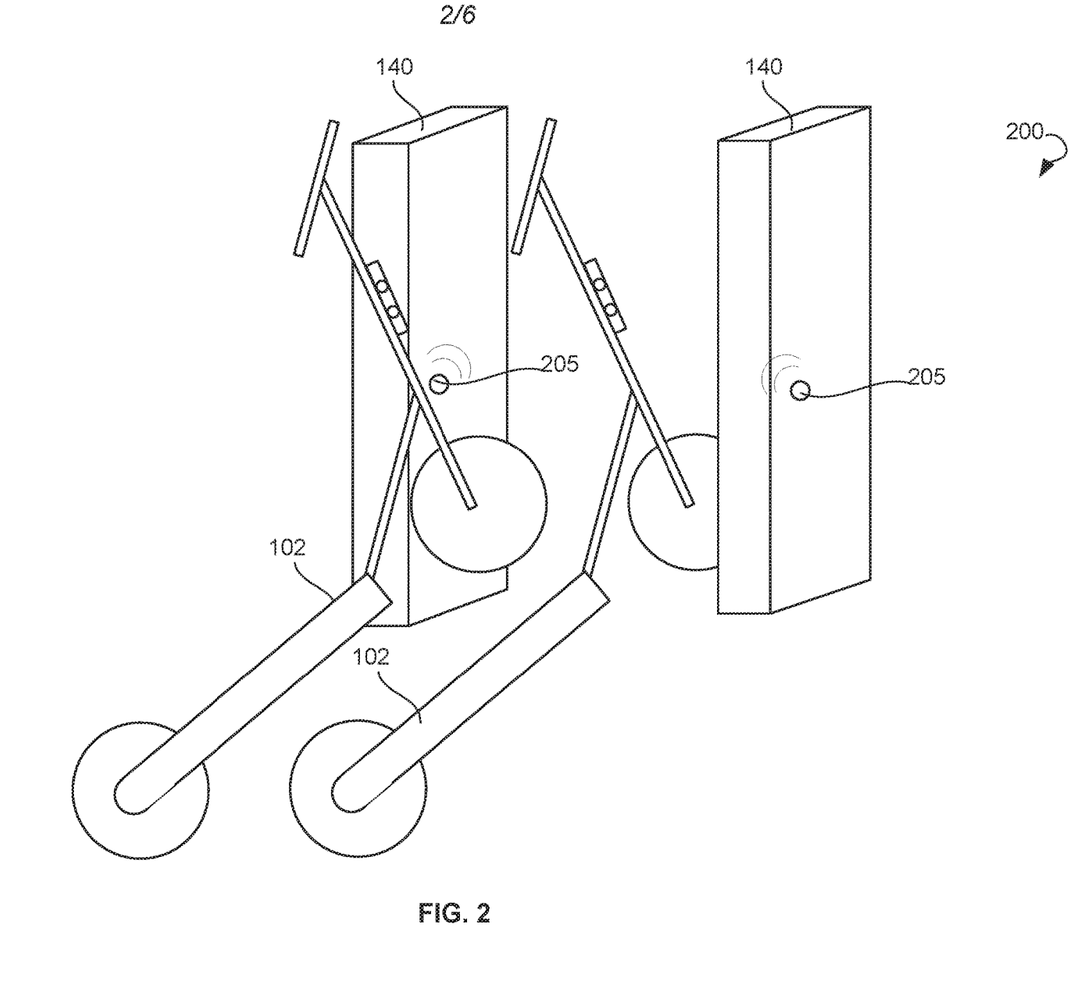
FIG. 2 is a schematic diagram illustrating determination of a parking status of the LEV, according to an example embodiment.

FIG. 2 is a schematic diagram 200 illustrating a determination of a parking status of the LEV 102, according to an example embodiment. The parking status can be determined by using a parking sensor 205. The parking sensor 205 can be associated with the charging structure 140. For example, the parking sensor 205 can be connected to or embedded into the charging structure 140. The parking sensor 205 can be configured to detect the presence of the LEV 102 in the charging structure 140. The parking sensor 205 may be configured to provide an indication of the presence of the LEV 102 in the charging structure 140 to a backend system. The parking sensor 205 can include one or more of the following: an optical reflection sensor, an optical beam sensor, an ultrasonic signal sensor, a road cell sensor, a magnetic sensor, an infrared reflective sensor, and so forth.

In some embodiments, the parking sensor 205 can be configured to determine whether the LEV 102 is parked properly in the charging structure 140, whether the LEV 102 is placed into a proper location of the charging structure 140, whether the LEV 102 is standing in an upright position, and so forth. A notification can be provided to a user of the LEV 102 with the information provided by the parking sensor 205.

In some embodiments, the LEV 102 can be parked in the charging structure 140 not by physically inserting the external connector interface 125 of the LEV 102 into the charging structure 140, but by connecting the LEV 102 to the charging structure 140 via a charging cable. The charging cable can have a predetermined length, such that the LEV 102 is parked at a distance from the charging structure 140 while being charged. The parking sensor 205 can be configured to determine whether the LEV 102 is placed at a proper location with respect to the charging structure 140.

In some example embodiments, the parking sensor 205 may provide information about the availability of parking slots in the charging structure 140 to a backend system in real time.

Figure 3:
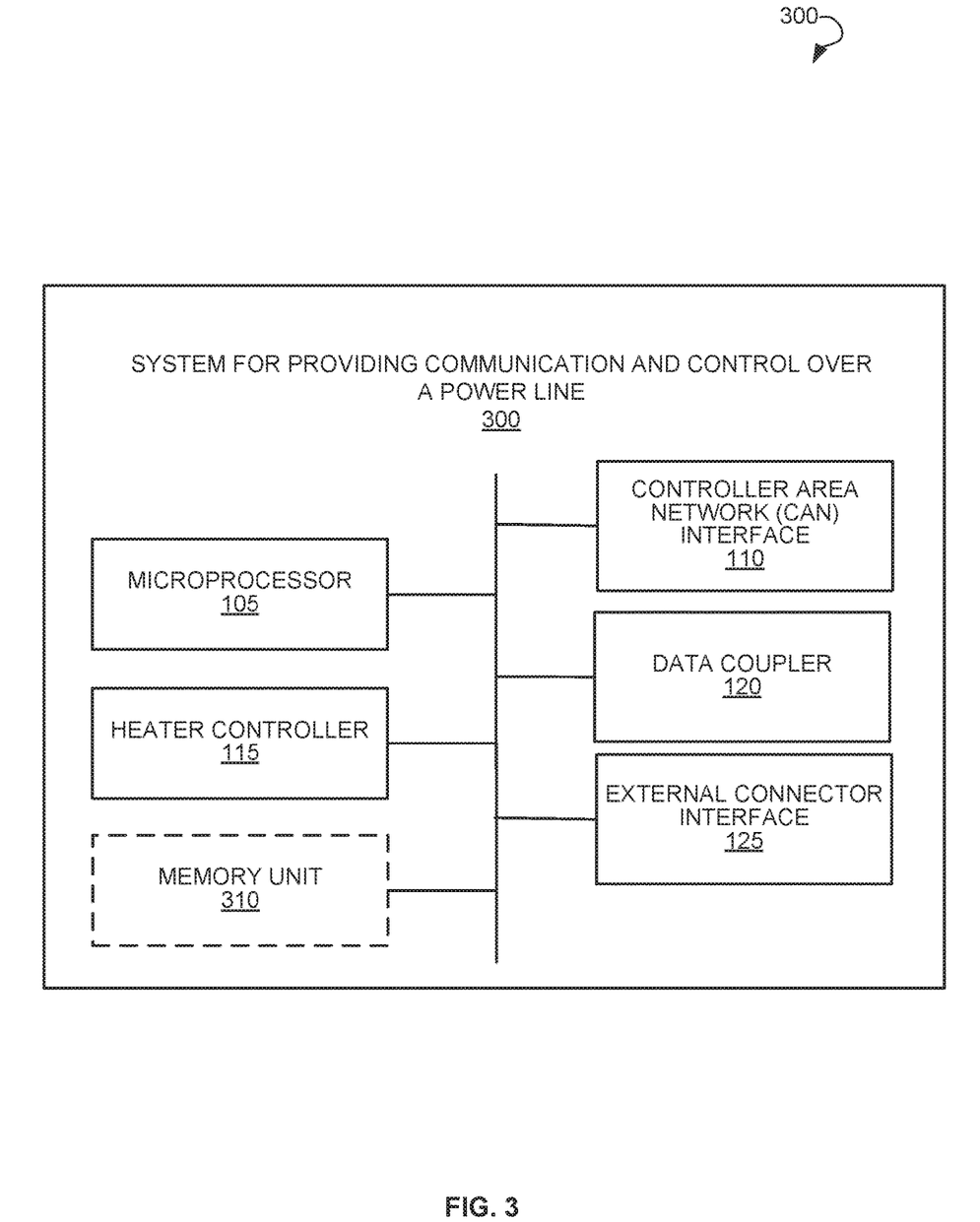
FIG. 3 is a block diagram showing a system for providing communication and control for an LEV over a power line, according to an example embodiment.

FIG. 3 is a block diagram showing a system 300 for providing communication and control for an LEV 102 over a power line, according to an example embodiment. The system 300 may include a microprocessor 105 and a memory unit 310 in communication with the processor 105 and configured to store instructions executable by the processor 105. The system 300 may further include a CAN interface 110, a heater controller 115, a data coupler 120, and an external connector interface 125.

Figure 4:
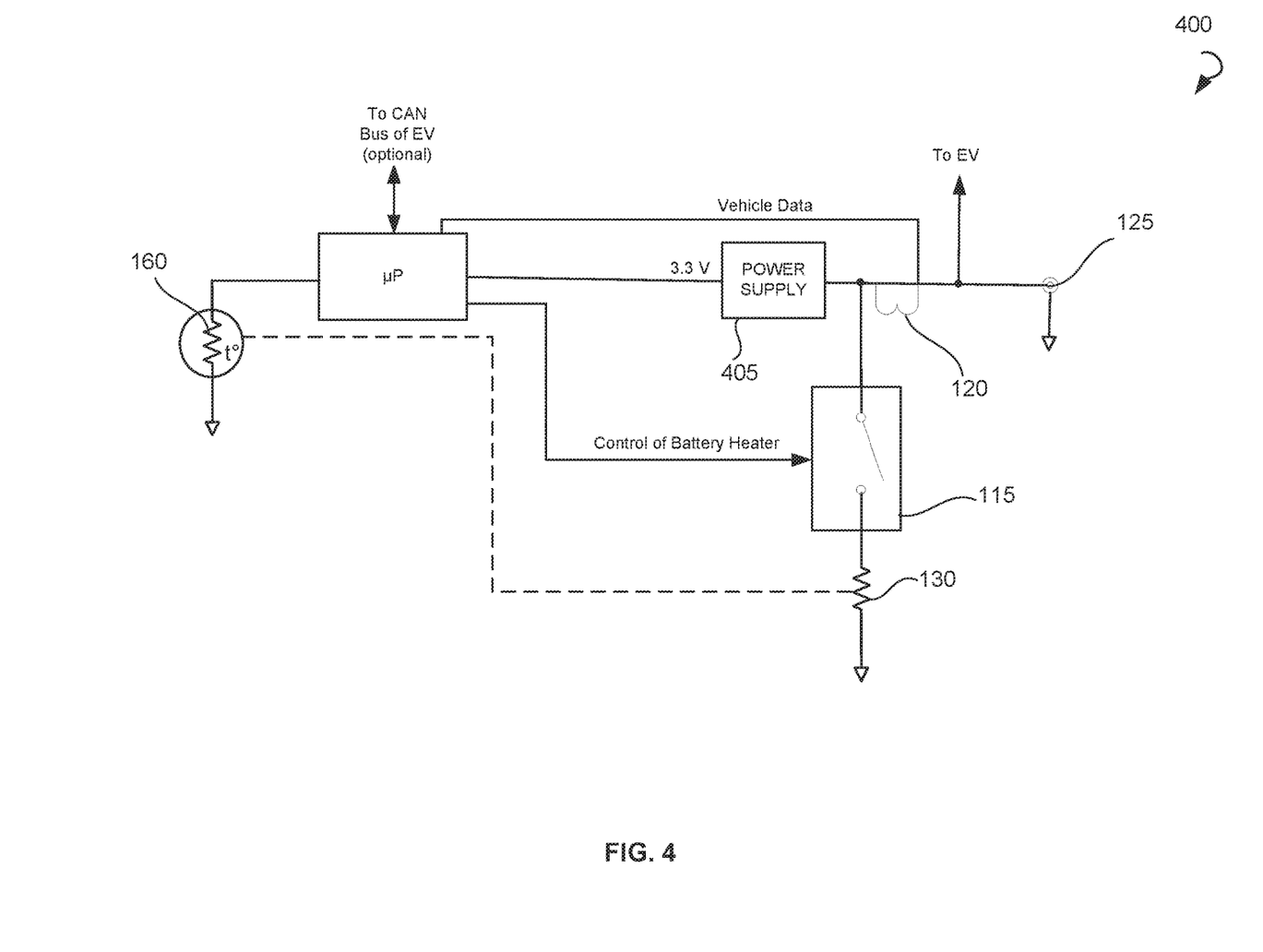
FIG. 4 shows a block diagram of a vehicle interface board, according to an example embodiment.

FIG. 4 shows a block diagram of a vehicle interface board 400, according to an example embodiment. The system 300 shown in FIG. 3 may include the vehicle interface board 400. The vehicle interface board 400 may be configured to be attached to the LEVs. The vehicle interface board 400 can control the components of the system 300 in the LEVs, including a microprocessor, a CAN interface, a heater controller 115, a data coupler 120, and an external connector interface 125. The vehicle interface board 400 can also be configured to communicate vehicle data to a charge head of the charging structure, as well as to exchange communications with a control system of the LEV. The data coupler 120 can be inductively coupled, capacitively coupled, or directly coupled to the power line. The vehicle interface board 400 may further include a power supply 405.

Figure 5:
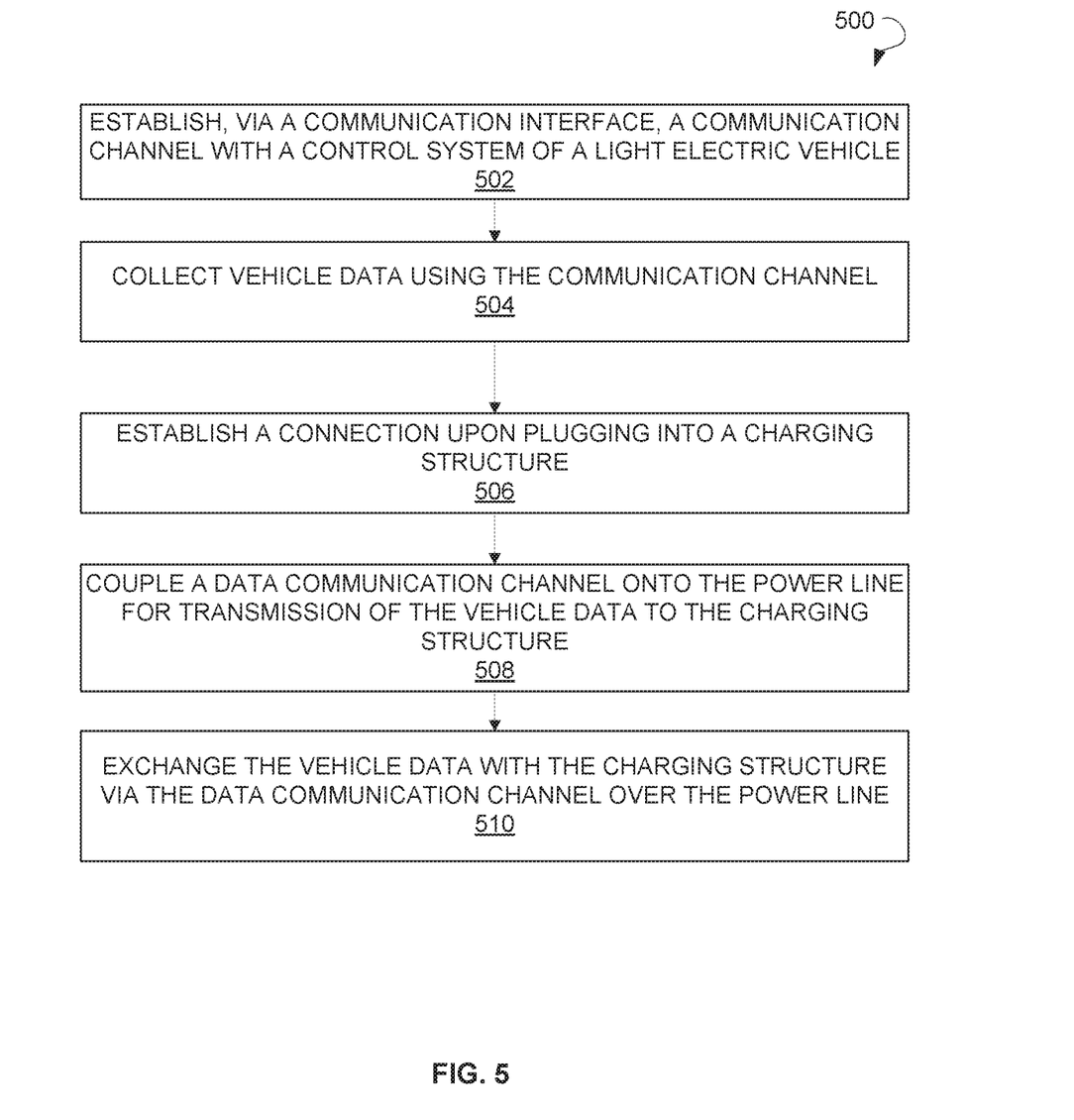
FIG. 5 is a process flow diagram showing a method for providing communication and control for an LEV over a power line, according to an example embodiment.

FIG. 5 is a process flow diagram showing a method 500 for providing communication and control for the LEV over a power line, according to an example embodiment. In some embodiments, the operations can be combined, performed in parallel, or performed in a different order. The method 500 may also include additional or fewer operations than those illustrated. The method 500 may be performed by processing logic that may comprise hardware (e.g., decision making logic, dedicated logic, programmable logic, and microcode), software (such as software run on a general-purpose computer system or a dedicated machine), or a combination of both.

The method 500 may commence with establishing, via a communication interface, a communication channel with a control system of the LEV at operation 502. The method 500 may further include collecting vehicle data using the communication channel at operation 504. At operation 506, a connection with the charging structure can be established. In an example embodiment, the connection with the charging structure can be established using a handshake technique.

The method 500 may further include coupling a data communication channel by a data coupler onto the power line for transmission of the vehicle data to the charging structure at operation 508. At operation 510, an external connector interface can be utilized to exchange the vehicle data with the charging structure via the data communication channel over the power line when the LEV is connected to the charging structure.

The method 500 may further include controlling, by a heater controller, a battery heater of the LEV. In some embodiments, the method 500 may include causing the heater controller to activate the battery heater when the temperature is below a threshold temperature.

The method 500 may further include causing the charging structure to transfer the vehicle data to a backend system associated with the charging structure using a cellular protocol. The vehicle data may include one or more of the following: charge information, battery requirements, battery state, pre-use settings, ID of the LEV, state of the battery, temperature of the batteries, vehicle circulation, infrastructure utilization, and so forth.

The method 500 may further include causing a temperature sensor to measure a temperature of a battery of the LEV. In some example embodiments, the method 500 may include receiving the temperature of the battery of the LEV from the control system of the LEV.

Figure 6:
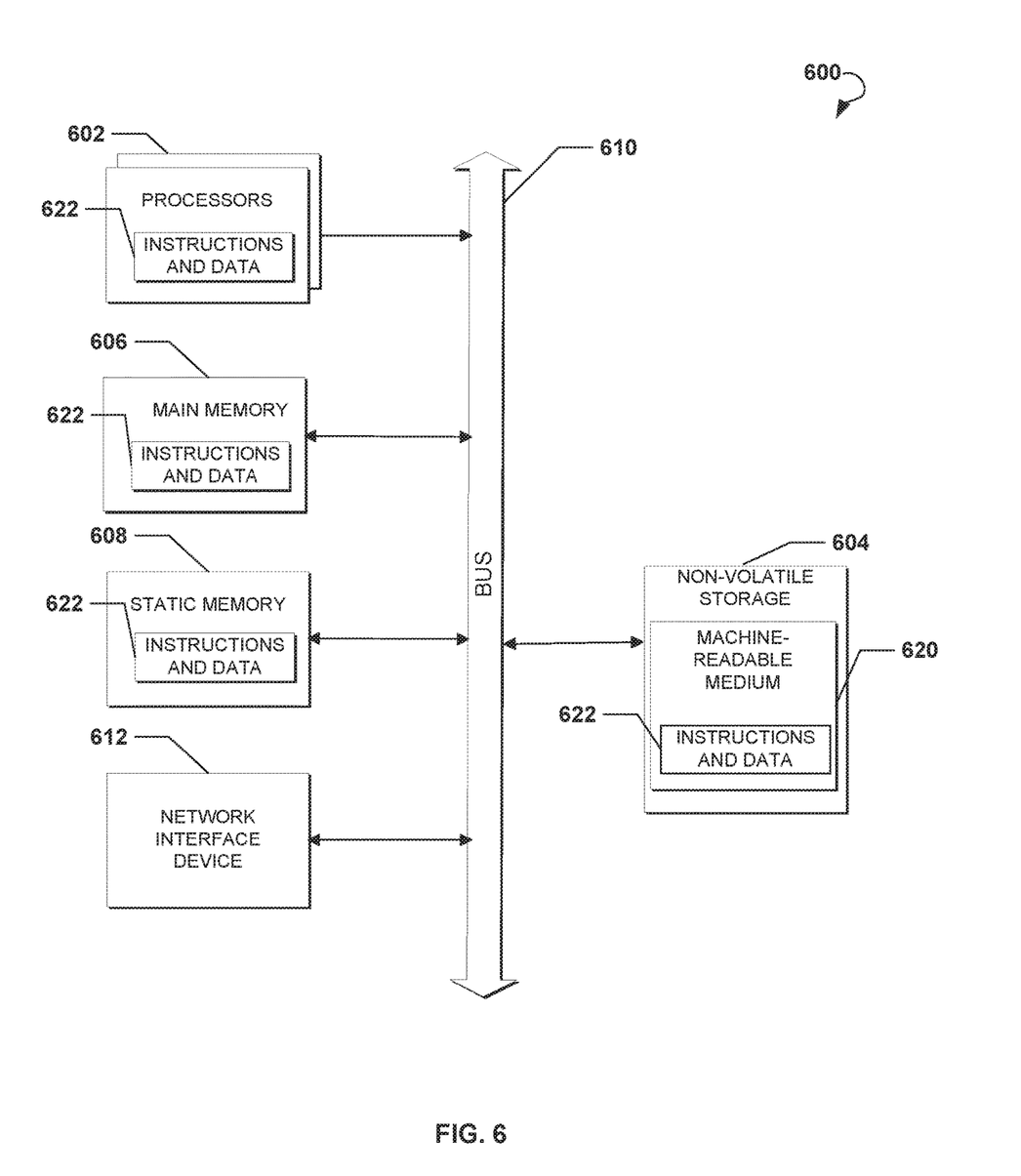
FIG. 6 is a computing system that can be used to implement a system and a method for providing communication and control for an LEV over a power line.

FIG. 6 shows a diagrammatic representation of a computing device for a machine in the exemplary electronic form of a computer system 600, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a field programmable gate array, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 may include a processor or multiple processors 602, a non-volatile storage 604, a main memory 606 and a static memory 608, which communicate with each other via a bus 610. The computer system 600 may also include a network interface device 612. The non-volatile storage 604 may include a computer-readable medium 620, which stores one or more sets of instructions and data 622 embodying or utilized by any one or more of the methodologies or functions described herein. The instructions and data 622 can also reside, completely or at least partially, within the main memory 606 and/or within the processors 602 during execution thereof by the computer system 600. The main memory 606 and the processors 602 also constitute machine-readable media.

While the computer-readable medium 620 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, Read-Only Memory, and the like.

The example embodiments described herein may be implemented in an operating environment comprising software installed on a computer, in hardware, or in a combination of software and hardware.

Thus, systems and methods for providing communication and control for an LEV over a power line have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for providing communication and control for a Light Electric Vehicle (LEV) over a power line, the system comprising:
   a microprocessor;
   an interface configured to communicate with a control system of the LEV;
   a heater controller configured to control a battery heater associated with a battery of the LEV, the controlling including activating the battery heater when a temperature of the battery is below a threshold temperature, the threshold temperature including a limit temperature at which the battery is permitted to be charged at a charging structure;
   a data coupler configured to couple a data communication channel onto the power line using voltage modulation, the power line being the only communication channel used to:
     communicate a power signal to provide power from the charging structure to the battery;
     bidirectionally communicate a data signal to exchange, in the data signal, vehicle data between the LEV and the charging structure, the vehicle data being associated with the LEV, the bidirectional communication being initiated by the LEV by announcing, by the LEV to the charging structure, a presence of the LEV connected to the charging structure; and
     when the temperature of the battery is below the threshold temperature and upon the communicating the vehicle data to the charging structure, receive, from the charging structure, a command for the heater controller to provide the power from the charging structure to the battery heater before providing the power from the charging structure to the battery;
     when the temperature of the battery reaches the threshold temperature:
       receive, from the charging structure, a command for the heater controller to stop the providing the power from the charging structure to the battery heater; and
       receive, from the charging structure, a command for the heater controller to initiate the providing the power from the charging structure to the battery; and
   an external connector interface configured to exchange the vehicle data with the charging structure via the data communication channel over the power line when the LEV is connected to the charging structure.

2. The system of claim 1, wherein the charging structure is configured to transfer the vehicle data to a backend system associated with the charging structure using a cellular protocol.

3. The system of claim 1, further comprising a temperature sensor configured to perform at least one of the following:
   measure the temperature of the battery of the LEV; and
   receive the temperature of the battery of the LEV from a control system of the LEV.

4. The system of claim 3, wherein the temperature sensor includes a thermistor.

5. The system of claim 1, wherein the vehicle data include one or more of the following: charge information, battery requirements, pre-use settings, an identifier (ID) of the LEV, a state of the battery, the temperature of the battery, vehicle circulation, and infrastructure utilization.

6. The system of claim 1, wherein the charging structure includes a parking sensor configured to provide an indication of the presence of the LEV in the charging structure to a backend system, wherein the parking sensor includes one or more of the following: an optical reflection sensor, an optical beam sensor, an ultrasonic signal sensor, a road cell sensor, a magnetic sensor, and an infrared reflective sensor.

7. The system of claim 1, wherein the external connector interface is configured to establish a communication with the charging structure.

8. The system of claim 7, wherein the external connector interface is configured to identify the LEV using a static ID device installed on the LEV.

9. The system of claim 1, wherein the power line includes a 2-wire power line.

10. The system of claim 1, wherein the interface is a Controller Area Network (CAN) interface.

11. A method for providing communication and control for a Light Electric Vehicle (LEV) over a power line, the method comprising:

establishing, via a communication interface, a communication channel with a control system of the LEV;

collecting vehicle data using the communication channel;

upon connecting of the LEV to a charging structure, establishing a connection with the charging structure;

coupling a data communication channel by a data coupler onto the power line using voltage modulation, the power line being the only communication channel used to:

communicate a power signal to provide power from the charging structure to the battery;

bidirectionally communicate a data signal to exchange, in the data signal, the vehicle data between the LEV and the charging structure, the vehicle data being associated with the LEV, the bidirectional communication being initiated by the LEV by announcing, by the LEV to the charging structure, a presence of the LEV connected to the charging structure;

when a temperature of the battery is below a threshold temperature and upon the communicating the vehicle data to the charging structure, receive, from the charging structure, a command for a heater controller to provide the power from the charging structure to a battery heater associated with the battery before providing the power from the charging structure to the battery;

when the temperature of the battery reaches the threshold temperature:

receive, from the charging structure, a command for the heater controller to stop the providing the power from the charging structure to the battery heater; and         receive, from the charging structure, a command for the heater controller to initiate the providing the power from the charging structure to the battery; and utilizing an external connector interface to exchange the vehicle data with the charging structure via the data communication channel over the power line; and controlling, by the heater controller, the battery heater, the controlling including activating the battery heater when the temperature of the battery is below the threshold temperature, the threshold temperature including a limit temperature at which the battery is permitted to be charged at the charging structure.

12. The method of claim 11, wherein the connection with the charging structure is established using a handshake technique.

13. The method of claim 11, further comprising causing the charging structure to transfer the vehicle data to a backend system associated with the charging structure using a cellular protocol.

14. The method of claim 11, further comprising causing a temperature sensor to measure the temperature of the battery of the LEV.

15. The method of claim 11, further comprising receiving the temperature of the battery of the LEV from the control system of the LEV.

16. The method of claim 11, wherein the vehicle data include one or more of the following: charge information, battery requirements, pre-use settings, an identifier (ID) of the LEV, a state of the battery, the temperature of the battery, vehicle circulation, and infrastructure utilization.

17. A system for providing communication and control for a Light Electric Vehicle (LEV) over a power line, the system comprising:

a microprocessor;

an interface configured to communicate with a control system of the LEV;

a temperature sensor configured to receive a temperature of a battery of the LEV;

a heater controller configured to control a battery heater associated with the battery of the LEV, the controlling including activating the battery heater when the temperature of the battery is below a threshold temperature, the threshold temperature including a limit temperature at which the battery is permitted to be charged at a charging structure;

a data coupler configured to couple a data communication channel onto the power line using voltage modulation, the power line being the only communication channel used to:

communicate a power signal to provide power from the charging structure to the battery;

bidirectionally communicate a data signal to exchange, in the data signal, vehicle data between the LEV and the charging structure, the vehicle data being associated with the LEV, the bidirectional communication being initiated by the LEV by announcing, by the LEV to the charging structure, a presence of the LEV connected to the charging structure; and     when the temperature of the battery is below the threshold temperature and upon the communicating the vehicle data to the charging structure, receive, from the charging structure, a command for the heater controller to provide the power from the charging structure to the battery heater before providing the power from the charging structure to the battery;

when the temperature of the battery reaches the threshold temperature:

receive, from the charging structure, a command for the heater controller to stop the providing the power from the charging structure to the battery heater; and         receive, from the charging structure, a command for the heater controller to initiate the providing the power from the charging structure to the battery; and an external connector interface configured to:

establish a communication via the charging structure associated with the LEV using a handshaking technique; and     exchange the vehicle data with the charging structure via the data communication channel over the power line when the LEV is connected to the charging structure.

\* \* \* \* \*